United States Patent [19]

Ewert

[11] 3,709,516
[45] Jan. 9, 1973

[54] MOTOR VEHICLE SUSPENSION SYSTEMS

[75] Inventor: Bruno Ewert, Russelsheim, Germany

[73] Assignee: General Motors Corporation, Detroit, Mich.

[22] Filed: Aug. 2, 1971

[21] Appl. No.: 168,184

[30] Foreign Application Priority Data

Aug. 13, 1970 Germany................P 20 40 236.2

[52] U.S. Cl............280/96.2 R, 180/73 R, 280/95 R, 280/112 R, 280/124 R
[51] Int. Cl. .................................................B62d 7/06
[58] Field of Search...280/96.2 R, 124 R, 112 R, 112 A, 280/96.1; 180/73 R, 71

[56] References Cited

UNITED STATES PATENTS

| | | | |
|---|---|---|---|
| 2,692,778 | 10/1954 | Stump | 280/112 R |
| 2,989,133 | 6/1961 | Hodkin | 280/124 R X |
| 3,239,235 | 3/1966 | Kozicki | 280/96.2 R |
| 3,074,737 | 1/1963 | Peras | 280/96.2 R |
| 2,753,190 | 7/1956 | Hooven | 280/112 R |

*Primary Examiner*—Benjamin Hersh
*Assistant Examiner*—John P. Silverstrim
*Attorney*—W. E. Finken et al.

[57] ABSTRACT

A suspension system for a motor vehicle includes a cranked axle which has at its central region a universal connection to a sprung portion of the vehicle. A pair of pivotal control arms prevent movement of the cranked axle about a vertical axis. A pair of wheel carriers are articulated to respective offset end portions of the cranked axle about hinge axes which converge forwardly to a point rearwardly of the universal connection for the cranked axle. A pair of telescopic shock absorbers, or other pivotal guide members, possibly associated with suspension springs, extend between the respective wheel carriers and the sprung portion of the vehicle. Wheel spindles forming rotary mountings for the road wheels are fixedly, or in the case of a front suspension pivotally, mounted on the wheel carriers.

The cranked axle comprises a pair of offset arm portions which may be interconnected either rigidly or, especially for a front suspension, hingedly about a substantially vertical hinge axis.

6 Claims, 7 Drawing Figures

MOTOR VEHICLE SUSPENSION SYSTEMS

This invention relates to suspension systems for motor vehicles.

The invention is concerned with a motor vehicle suspension system which combines advantages from both rigid-axle and independent wheel suspension systems.

The appended claims define the scope of the invention claimed. The invention and how it can be performed are hereinafter particularly described with reference to the accompanying drawings, in which:

Figure 1:
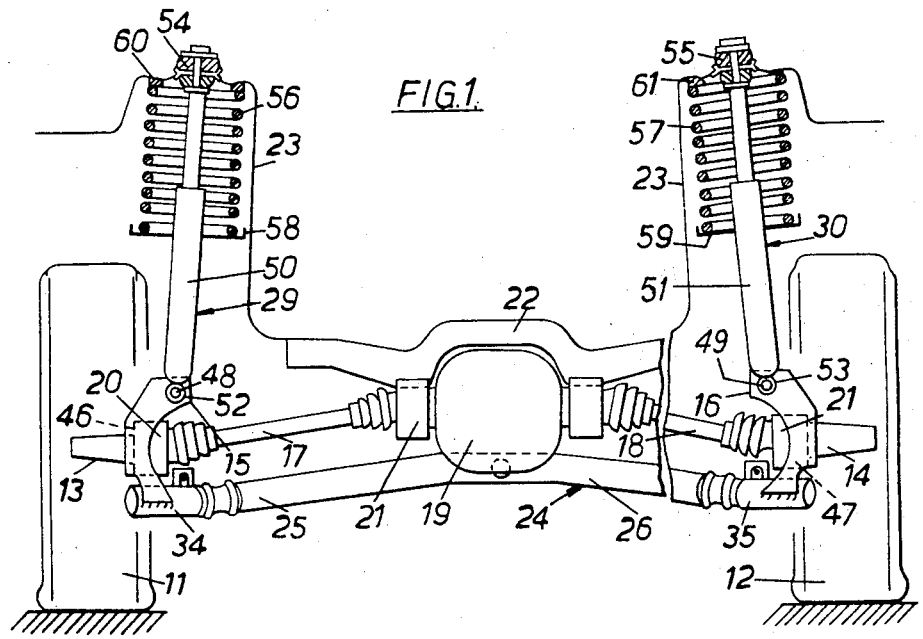
FIG. 1 is a fragmentary rear view of the rear-axle region of a motor vehicle, showing one embodiment of a suspension system in accordance with the invention.
Figure 2:
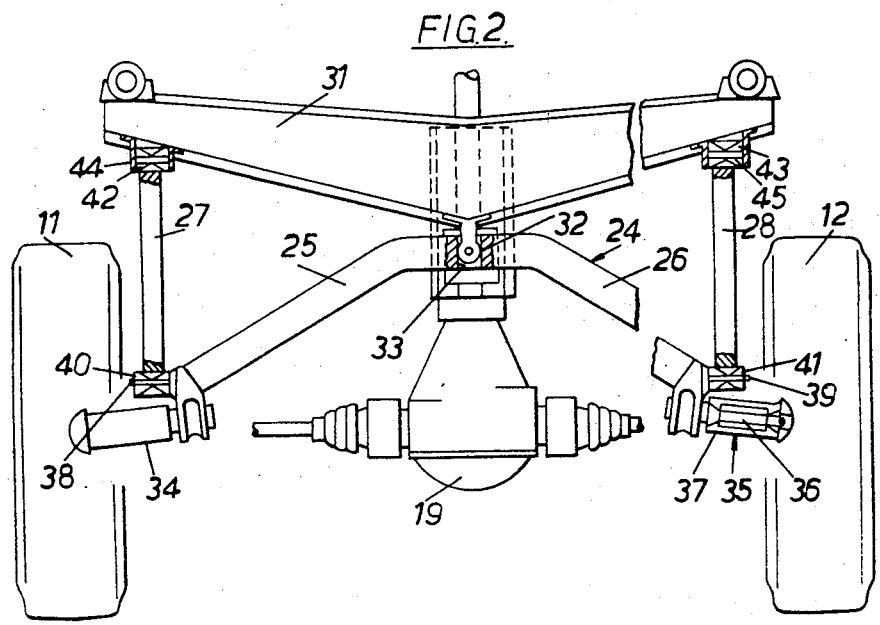
FIG. 2 is a fragmentary plan, with some parts in section, of the same rear suspension system, with a pair of upper pivotal guide members omitted for clarity.
Figure 3:
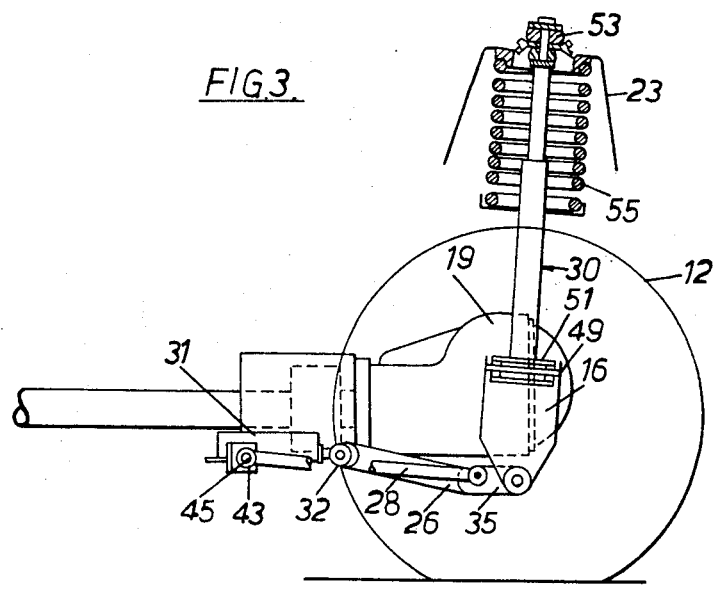
FIG. 3 is a fragmentary side elevation of the same rear suspension system.

In the embodiment of a motor vehicle suspension system in accordance with the invention which is shown in FIGS. 1, 2 and 3 of the drawings, stub shafts 13 and 14 forming wheel spindles for rotatably supporting respective ones of an opposed pair of rear wheels 11 and 12 of the vehicle are rotatably mounted on wheel carriers 15 and 16 respectively and are arranged to be driven by way of drive shafts 17 and 18 from a differential gear 19. The drive shafts 17 and 18 are connected to the stub shafts 13 and 14 and to the differential gear 19 by way of constant-velocity drive joints 20 and 21. The differential gear 19 is secured by way of a cross-member 22 to the vehicle superstructure 23, these parts 19, 22 and 23 constituting parts of the sprung portion of the vehicle.

The wheel carriers 15 and 16 extend approximately equal amounts in a vertical direction above and below the wheel centers. Wheel guiding is effected by means of a transversely extending cranked axle 24 having offset arm portions 25 and 26 respectively for the wheel carriers, 15 and 16 of the two wheels, in conjunction with longitudinal control arms 27 and 28 in the form of trailing arms for preventing movements of the cranked axle 24 in a substantially horizontal plane. Guiding is further given by telescopic shock absorbers (dampers) 29 and 30 respectively, each articulated in hinge fashion to the upper portion of the respective wheel carrier, to thereby form pivotal guide members for the cranked axle 24. The hinge axes of the shock absorbers are arranged approximately horizontally and in the longitudinal direction of the vehicle, with the result that the wheel carriers 15 and 16 are able to absorb the forces acting in the central rotational plane of each wheel, such as arise during accelerating and braking.

As seen in plan, the cranked axle 24 is V-shaped. In its central region, in the middle of the vehicle, it is mounted in ball-joint fashion by means of a universal connection to a cross-member 31 extending across the entire width of the vehicle. The cross-member 31 is in turn resiliently secured over a wide base to the vehicle superstructure. A ball-headed pin 32 is secured to the cross-member, for centrally mounting the cranked axle, and engages in a socket formed by a central cylindrical cavity 33 in the cranked axle 24, to provide lost motion in a direction longitudinally of the vehicle.

The cranked axle has offset outboard end portions 34 and 35 including respective pins 36 on which the wheel carriers 15 and 16 are rotatably mounted by means of bearing eyes 37 secured at a relatively low level on the wheel carriers. The axes of these hinge-jointed connections run obliquely to a transverse plane and rise slightly towards the center of the vehicle.

The point of intersection of these hinge axes with a transverse plane through the point of articulation of the cranked axle at the vehicle superstructure, determines for two-wheel bump (as when both wheels pass over an obstacle), the kinematic swing-arm length, which is decisive for camber control of the respective wheel. Additionally, the change of track during spring deflection is kept within narrow limits by the low position of the crank pins relative to the wheel carriers.

Secured to each of the end portions of the cranked axle there is a pin 38, 39 respectively, to which the respective longitudinal control arm 27, 28 is pivotally connected by means of a bearing eye 40, 41. The longitudinal control arms are pivotally connected by means of bearing eyes 42, 43 containing rubber bushings to provide some resilient lost motion, to pins 44, 45 secured to the cross-member 31.

At the wheel centers, the wheel carriers 15 and 16 have respective through apertures 46 and 47 for the drive shafts 17 and 18 or for the constant-velocity joints.

Secured to the upper portions of the wheel carriers there are respective pins 48 and 49 to which casing portions 50 and 51 of the shock absorbers 29 and 30 are hingedly connected by means of bushings 52 and 53 respectively. The axis of each of these hinge connections extends in the longitudinal direction of the vehicle, and is at right angles to the axis of the shock absorber. These hinge connections are made relatively long, to ensure that the forces acting in the plane of the wheel may be taken up over a wide base.

The upper ends of the shock absorbers 54 and 55 are universally connected to the vehicle superstructure 23 by means of rubber elements. A main suspension spring for each wheel is in the form of a helical spring 56, 57 which is arranged concentrically of the telescopic shock absorber and is seated at its bottom end on a spring plate 58, 59 connected to the casing of the shock absorber, and is seated at its upper end against the superstructure via an interposed rubber ring 60, 61.

Figure 4:
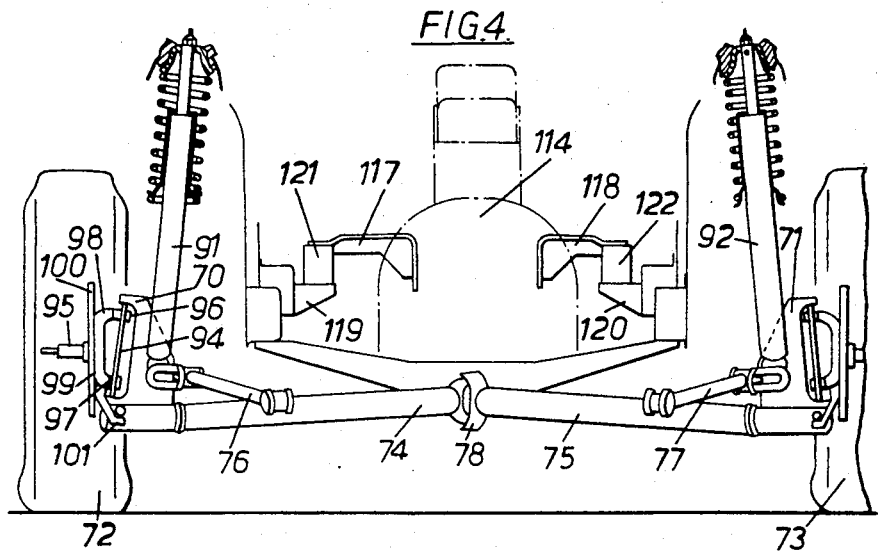
FIGS. 4 to 6 are views similar to FIGS. 1 to 3 respectively, illustrating a second embodiment of a suspension system in accordance with the invention, in this case a front suspension.
Figure 5:
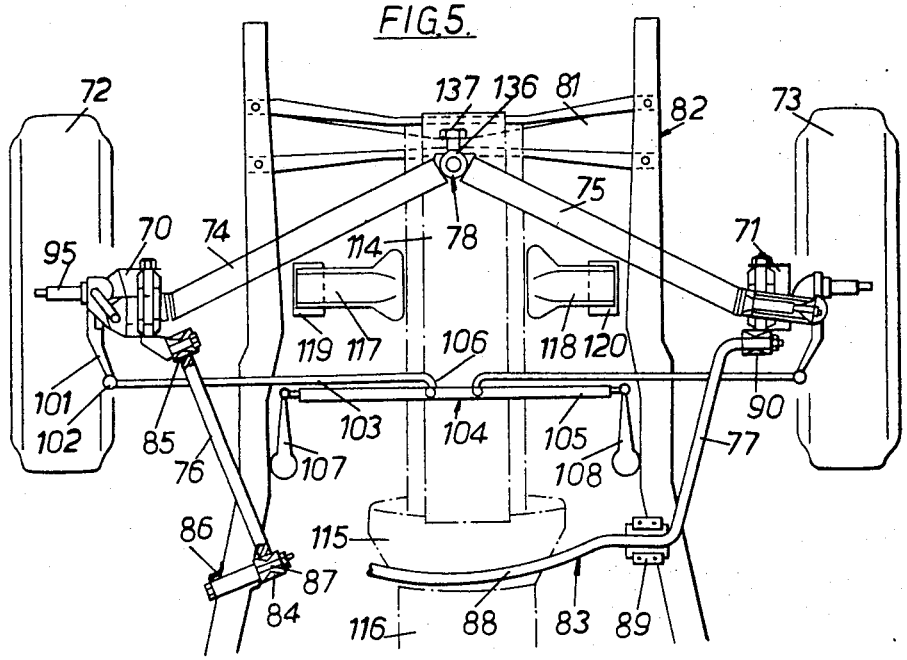
Figure 6:
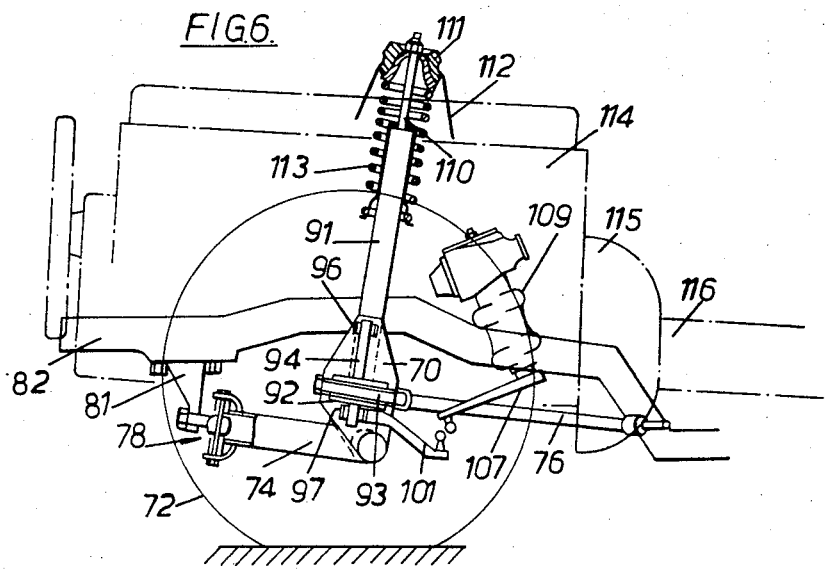
Figure 7:
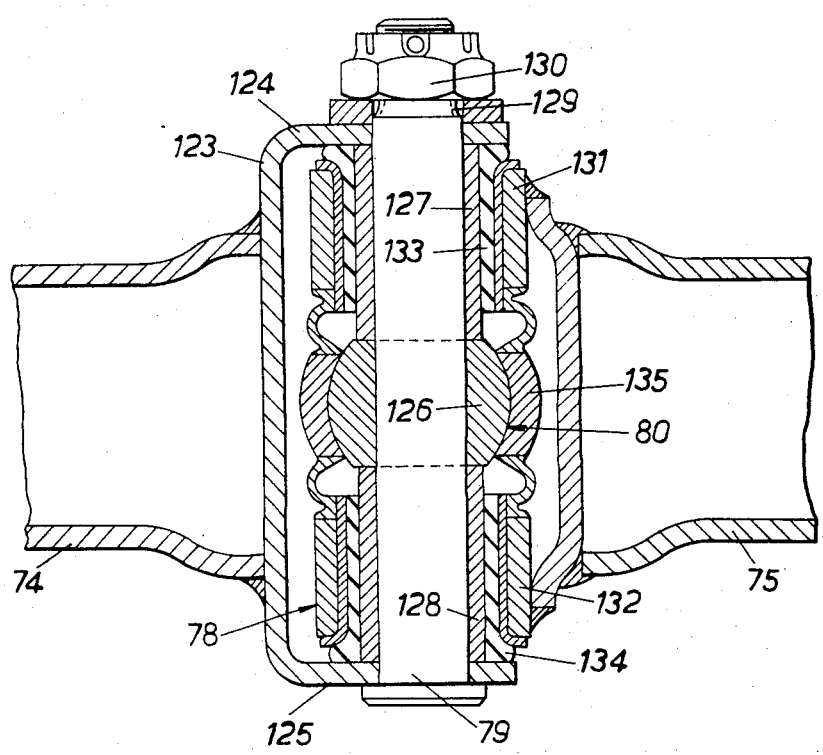
FIG. 7 is an enlarged section through a universal connection between a pair of arm portions of a cranked axle in the second embodiment of the suspension system.

In a second embodiment, shown in FIGS. 4 to 6, the invention is utilized in a suspension system for the steerable front wheels of a motor vehicle. As in the first embodiment, the wheel carriers 70 and 71 for the two front wheels 72 and 73 are guided by forwardly extending offset arm portions 74 and 75 respectively of a cranked axle, and they are also guided by rearwardly, obliquely directed control arms 76 and 77. By means of a hinge joint 78, whose hinge pin 79 has a universally articulated mounting to a cross-member 81 of the front frame 82, the two offset control arms 74 and 75 are interconnected in such a way that, during the resulting wheel movements, pivotal movement taking place about a transverse axis imagined at the point of interconnection of the cranked arm portions is transmitted from one offset control arm to the other one (FIG. 7).

As will be seen from the right-hand half of FIG. 5, the obliquely directed control arms 76, 77 may alternatively be formed by the offset arms of a stabilizer spring 83.

The obliquely directed control arms 76 and 77 are provided at their ends with bearing eyes 84 and 85 by means of which they are pivotally connected at one end to the respective wheel carrier and at the other end to a hinge pin 87 that is mounted on a bearing bracket 86. When a stabilizer spring 83 is used, a bearing 89 is provided at the ends of the transversely extending central portion 88, the hinge axis of this bearing extending in the transverse direction of the vehicle, like the bearing 90 on the wheel carrier. As in the first embodiment, the wheel carriers 70 and 71 are hingedly connected to the offset control arms 74 and 75. The hinge axis of this connection runs obliquely to the line joining the wheel centers, thus resulting in a swing-arm length which is particularly favorable in relation to track and camber control of the wheels.

Support of the wheels in the wheel plane (this support being of importance during accelerating and braking) is again provided by telescopic shock absorbers (dampers) 91 and 92 having hinge connections to the respective wheel carriers 70 and 71, with the hinge axes extending parallel to the longitudinal axis of the vehicle and rising slightly in a forward direction corresponding to the rearward inclination of the shock absorbers.

As is clearly shown in FIG. 6, which shows a side elevation of the wheel suspension, the hinge connection between the wheel carrier 70 and the shock absorber, such as 91, utilizes a wide bearing eye 92 which is mounted on a correspondingly long pivot pin 93 of the wheel carrier.

The side elevation shown in FIG. 6 further shows that the rearwardly extending oblique control arm 76 is arranged to rise slightly in the direction of travel. This arrangement, in conjunction with the similarly forwardly rising arrangement of the offset control arms 74 and 75, provides oblique springing of the wheel carriers, and therefore of the wheels, in that, upon striking an obstacle, the wheels are able to deflect somewhat rearwardly in the direction of impact, to provide "compliance" resulting in improved ride comfort.

Moreover, as is also shown in FIG. 6, each wheel carrier 70 includes a substantially vertically arranged pivot pin 94 forming the steering axis for the respective wheel. On this pivot pin, the stub shaft 95 is hingedly mounted by means of an upper bearing eye 96 and a lower bearing eye 97. Mounted between the stub shaft 95 and control arms 98 and 99 carrying the bearing eyes 96 and 97 there is a support plate 100 from which the steering lever arm 101 extends rearwardly in a substantially horizontal direction. This steering lever arm is connected by way of a ball joint 102 to one of the lateral track rods 103 of a three-part steering linkage 104, the lateral track rod being itself connected, at the same side of the longitudinal axis of the vehicle but at a short distance therefrom, by way of a ball joint 106, to a drag link 105 forming a central track rod portion.

The central track rod portion 105 is guided by means of two hinged levers 107 and 108 in the manner of a link quadrilateral, the left-hand lever 107 being formed by the drop arm of the steering gear 109.

The upper end of a piston rod 110, of each of the telescopic shock absorbers 91 and 92 is universally resiliently mounted at the vehicle superstructure 112 by means of a rubber element 111. A main suspension spring in the form of a helical spring 113 is arranged, concentrically with respect to the shock absorber axis, between the casing of each of the telescopic shock absorbers and the vehicle superstructure 112.

The hinge joint 78 interconnecting the offset arm portions 74 and 75 is illustrated in detail in FIG. 7. The offset arm portions are formed as tubes, and a yoke 123 with two flanges 124 and 125 is welded on to the left-hand arm portion 74. In the central region of the hinge pin 79 there is a spherical head 126, and this is flanked on each side by a sleeve 127 and 128 respectively. At its end, the hinge pin 79 is provided with a thread 129 on which a nut 130 is screwed. By tightening the nut, the parts mounted on the hinge pin 79, namely the spherical head 126 and the sleeves 127 and 128, are firmly connected to the flanges 124 and 125 of the yoke 123, such that these parts constitute a rigid unit with the left-hand arm portion 74.

Welded on to the right-hand arm portion 75, there are two bearing eyes 131 and 132 which are mounted by way of rubber/metal bushes 133 and 134 on the sleeves 127 and 128 flanking the spherical head 126.

The spherical head 126 on the hinge pin 79 is mounted in a ball socket 135 which is secured by way of a shank portion 136 thereof to the central region of the cross-member 81 by means of a nut 137.

In this second embodiment, the modification of the cranked axle (as compared with the first embodiment) such that there are two individual offset arm portions which are hinged together by means of the central hinge joint results in the advantage that the path of movement of the steering lever on the basis of the arrangement and formation of the track linkage coincides to a high degree with its path of movement determined by the wheel suspension geometry. Because of this close coincidence of the paths of movement, the steering lock is not influenced during deflection of the suspension springs.

A vehicle power unit consisting of an engine 114, a clutch 115 and a gearbox 116, is resiliently mounted in its forward region by means of two brackets 117 and 118 on two consoles 119 and 120 secured to the front frame, with the interposition of rubber blocks 121 and 122.

The embodiments of the suspension system in accordance with the invention which have just been described possess the following advantageous features:

i. The universal connection of the cranked axle to the vehicle superstructure provides a lower unsprung mass than a conventional rigid-axle suspension, without mechanical coupling of the wheels on two-wheel bump.

ii. The universal connection of the cranked axle to the vehicle superstructure also provides lateral guidance for the wheels. During two-wheel bump there is no relative lateral displacement of the sprung and unsprung masses, and there is only small lateral displacement during one-wheel bump.

iii. The articulation of the wheel carriers in hinge-like manner to the offset end portions of the cranked axle provides increasing negative camber on one-wheel bump (and also on two-wheel bump), so favorably influencing the lateral guidance force produced at the wheel/road contact area. Specifically, on one-wheel bump, the deflected wheel experiences a greater change in the direction of negative camber than with a De Dion type of suspension, and the undeflected wheel at the opposite end of the cranked axle experiences a lesser change in the direction of positive camber than with a De Dion suspension.

iv. There is no unfavorable camber change during roll, the camber remaining constant during roll, (or possibly giving a very small, load-responsive camber change).

v. The universal connection of the cranked axle to the vehicle superstructure determines the roll center, and a low kinematic roll center can readily be achieved.

vi. There is no change in track during one-wheel bump, only a small change (a load-responsive change) in track during two-wheel bump, and only a small change or no change in track during roll.

vii. In the first embodiment, the control arms are longer than the arm portions of the cranked axle, this reducing understeering during cornering and also reducing the torsional stresses which are imposed on the control arms as a result of canting.

viii. In the second embodiment, the hinged interconnection of the arm portions of the cranked axle gives almost exact steering geometry using transversely extending tie rods of feasible length. For optimum steering geometry the inboard tie rod joints should be as near as possible to the connecting line between the universal connection 32 and the respective crank pin 36.

I claim:

1. Motor vehicle suspension system comprising a cranked axle, a universal connection between the central region of the cranked axle and a sprung portion of the vehicle, a pair of pivotal control arms extending between the cranked axle and the sprung portion of the vehicle and arranged to prevent movement of the cranked axle about a vertical axis, a pair of wheel carriers hingedly connected to respective end portions of the cranked axle about hinge axes which converge forwardly to a point of intersection disposed rearwardly of the universal connection between the cranked axle and the sprung portion of the vehicle, a pair of guide members pivotally connected to respective ones of the pair of wheel carriers and to the sprung portion of the vehicle, suspension spring means interposed between the cranked axle and the sprung portion of the vehicle, and a pair of wheel spindles mounted on the respective wheel carriers for rotatably supporting a laterally opposed pair of wheels of the vehicle.

2. Motor vehicle suspension system comprising a cranked axle, a universal connection between the central region of the cranked axle and a sprung portion of the vehicle, a pair of pivotal control arms extending between the cranked axle and the sprung portion of the vehicle and arranged to prevent movement of the cranked axle about a vertical axis, a pair of offset end portions at the outboard ends of the cranked axle, a pair of wheel carriers hingedly connected to the offset end portions of the cranked axle about respective hinge axes which converge forwardly to a point of intersection disposed rearwardly of the universal connection between the cranked axle and the sprung portion of the vehicle, which axes additionally intersect the central plane of wheel rotation on the other side of the vehicle at a point of intersection that is disposed rearwardly of a transverse vertical plane through the universal connection between the cranked axle and the sprung portion of the vehicle, a pair of telescopic guide members pivotally connected to respective ones of the pair of wheel carriers and to the sprung portion of the vehicle, and a pair of wheel spindles mounted on the respective wheel carriers for rotatably supporting a laterally opposed pair of wheels of the vehicle.

3. Motor vehicle suspension system comprising a cranked axle, a universal connection between the central region of the cranked axle and a sprung portion of the vehicle, a pair of pivotal control arms extending between the cranked axle and the sprung portion of the vehicle and arranged to prevent movement of the cranked axle about a vertical axis, a pair of offset end portions at the outboard ends of the cranked axle, a pair of wheel carriers hingedly connected to the offset end portions of the cranked axle about respective hinge axes which converge forwardly to a point of intersection disposed rearwardly of the universal connection between the cranked axle and the sprung portion of the vehicle, a pair of rearwardly inclined telescopic shock absorbers each of which is articulated at its upper end to the sprung portion of the vehicle and is hingedly connected at its lower end to the respective wheel carrier about a hinge axis which is at right angles to the shock absorber axis and is disposed in a longitudinal plane, a pair of suspension springs concentric with the respective telescopic shock absorbers and interposed between the cranked axle and the sprung portion of the vehicle, and a pair of wheel spindles mounted on the respective wheel carriers for rotatably supporting a laterally opposed pair of wheels of the vehicle.

4. Motor vehicle suspension system comprising a cranked axle that includes first and second offset arm portions rigidly connected together in a central region of the axle, a universal connection between the central region of the cranked axle and a sprung portion of the vehicle, and comprising a spherical head accommodated in a cylindrical cavity to thereby provide longitudinal lost motion, a pair of longitudinally extending control arms which are pivotally connected at forward ends thereof to the sprung portion of the vehicle and are pivotally connected at rearward ends thereof to the respective arm portions of the cranked axle, to thereby prevent movement of the cranked axle about a vertical axis, a pair of offset end portions at the outboard ends of the respective arm portions of the cranked axle, a pair of wheel carriers hingedly connected to the offset end portions about respective hinge axes which converge forwardly to a point of intersection disposed rearwardly of the universal connection between the cranked axle and the sprung portion of the vehicle, a pair of rearwardly inclined telscopic shock absorbers which are articulated at their upper ends to the sprung portion of the vehicle and are hingedly connected at their lower ends to the respective wheel carriers about respective generally longitudinally extending hinge axes disposed at right angles to the shock absorber axis, a pair of suspension springs interposed between the cranked axle and the sprung portion of the vehicle, and a pair of wheel spindles rigidly mounted on the respective wheel carriers for rotatably supporting a laterally opposed pair of wheels of the vehicle.

5. Motor vehicle suspension system comprising a cranked axle that includes first and second offset arm portions resiliently hinged together in a central region of the axle, about a generally vertical hinge axis, a universal connection between the central region of the cranked axle and a sprung portion of the vehicle, a pair of control arms which are convergent in a rearward direction and are pivotally connected at rearward ends thereof to the sprung portion of the vehicle and are pivotally connected at forward ends thereof to the respective arm portions of the cranked axle, to thereby prevent movement of the cranked axle about a vertical axis, a pair of offset end portions at the outboard ends of the respective arm portions of the cranked axle, a pair of wheel carriers hingedly connected to the offset end portions about respective hinge axes which converge forwardly to a point of intersection disposed rearwardly of the universal connection between the cranked axle and the sprung portion of the vehicle, a pair of rearwardly inclined telescopic shock absorbers which are articulated at their upper ends to the sprung portion of the vehicle and are hingedly connected at their lower ends to the respective wheel carriers about respective generally longitudinally extending hinge axes disposed at right angles to the shock absorber axis, a pair of suspension springs interposed between the cranked axle and the sprung portion of the vehicle, a pair of wheel spindles which are movably mounted on the respective wheel carriers for rotatably supporting a laterally opposed pair of front wheels of the vehicle, steering arm means rigidly connected to at least one of the movably mounted wheel spindles, and a steering mechanism pivotally connected to said steering arm means.

6. Motor vehicle suspension system according to claim 5, in which the steering mechanism includes a drag link pivotally connected to a pair of opposed track rods to form a transversely extending three-part track rod arrangement, the wheel spindles are pivotally connected by way of respective steering arms to respective ones of the opposed track rods, and the opposed track rods are pivotally connected to the drag link at a position which is at the same level as the roll axis of the sprung portion of the vehicle and is disposed between this roll axis and a line between the universal connection for the cranked axle and the pivotal connections from the control arms to the sprung portion of the vehicle.

* * * * *